United States Patent
Oonishi et al.

(10) Patent No.: US 12,137,703 B2
(45) Date of Patent: Nov. 12, 2024

(54) OILY FOOD AND PRODUCING METHOD THEREOF

(71) Applicant: THE NISSHIN OILLIO GROUP, LTD., Tokyo (JP)

(72) Inventors: Kiyomi Oonishi, Kanagawa (JP); Wakako Kanamaru, Kanagawa (JP); Muneo Tsukiyama, Kanagawa (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 755 days.

(21) Appl. No.: 17/275,661

(22) PCT Filed: Sep. 10, 2019

(86) PCT No.: PCT/JP2019/035501
§ 371 (c)(1),
(2) Date: Mar. 11, 2021

(87) PCT Pub. No.: WO2020/054701
PCT Pub. Date: Mar. 19, 2020

(65) Prior Publication Data
US 2022/0039422 A1 Feb. 10, 2022

(30) Foreign Application Priority Data
Sep. 13, 2018 (JP) .................. 2018-171451

(51) Int. Cl.
*A23G 1/38* (2006.01)
*A23D 7/00* (2006.01)
*A23D 9/00* (2006.01)

(52) U.S. Cl.
CPC .............. *A23G 1/38* (2013.01); *A23D 7/001* (2013.01); *A23D 9/00* (2013.01); *A23V 2002/00* (2013.01)

(58) Field of Classification Search
CPC ............ A23G 1/38; A23D 7/001; A23D 9/00
See application file for complete search history.

(56) References Cited

U.S. PATENT DOCUMENTS

2017/0035072 A1* 2/2017 Hasegawa ................ A23D 9/00

FOREIGN PATENT DOCUMENTS

| JP | 2007236348 | 9/2007 |
| JP | 2008161106 | 7/2008 |
| JP | 2009284899 | 12/2009 |
| JP | 2010532802 | 10/2010 |
| JP | 2010532803 | 10/2010 |
| JP | 2011055752 | 3/2011 |
| JP | 2012070655 | 4/2012 |
| WO | 2012002373 | 1/2012 |
| WO | 2017057131 | 4/2017 |
| WO | 2017169623 | 10/2017 |
| WO | 2019026670 | 2/2019 |

OTHER PUBLICATIONS

JP 2007-236348 English Translation. (Year: 2007).*
"Office Action of China Counterpart Application", issued on Feb. 16, 2023, with English translation thereof, pp. 1-10.
"International Search Report (Form PCT/ISA/210) of PCT/JP2019/035501", mailed on Nov. 26, 2019, with English translation thereof, pp. 1-4.

* cited by examiner

*Primary Examiner* — Stephanie A Cox
(74) *Attorney, Agent, or Firm* — JCIPRNET

(57) ABSTRACT

The present invention addresses the problem of providing an oily food, such as chocolate or cream, which does not require tempering treatment and in which the occurrence of blooming and the like is suppressed even when a large amount of cocoa butter is used; and producing method thereof. The present invention provides an oily product containing a fat/oil as a continuous phase. The fat/oil contains SOS, HMM, HLM, HLL, HHM and HHL. The mass ratio (HLM/HLL) of the HLM content to the HLL content is 1.0 or more. The mass ratio (HMM+HLM+HLL+HHM+HHL)/SOS of the total content of HMM, HLM, HLL, HHM and HHL to the SOS content is 0.9 to 8. In HMM, HLM, HLL, HHM and HHL, fatty acids having a carbon number of 20 or more occupy less than 3% by mass of the total constituent fatty acids H.

8 Claims, No Drawings

OILY FOOD AND PRODUCING METHOD THEREOF

CROSS-REFERENCE TO RELATED APPLICATION

This application is a 371 application of the International PCT application serial no. PCT/JP2019/035501, filed on Sep. 10, 2019, which claims the priority benefit of Japan Patent Application No. 2018-171451, filed on Sep. 13, 2019. The entirety of each of the above-mentioned patent applications is hereby incorporated by reference herein and made a part of this specification.

TECHNICAL FIELD

The present invention relates to an oily food having excellent bloom resistance and grain resistance.

BACKGROUND ART

Examples of oily foods in which fats/oils are in a continuous phase include chocolate, fat cream, butter cream, margarine, and spreads. The hardness and plasticity of oily foods are maintained by fats/oils. That is, the crystal structure of fats/oils forming a continuous phase greatly influences the quality of oily foods.

For example, chocolate can be roughly classified as a temper type or a non-temper type according to characteristics of fats/oils. In temper type chocolate, fats/oils contained in the chocolate are composed of cocoa butter or a symmetric triacylglycerol similar to the structure of cocoa butter. For temper type chocolate, a complicated temperature control operation called tempering is performed. According to tempering, crystals of symmetric triacylglycerols of fats/oils are adjusted to Form V which is a stable form. When the crystal form of fats/oils is Form V, chocolate having favorable releasability and gloss is obtained.

On the other hand, for non-temper type chocolate, tempering or a special temperature control device is not required. Therefore, non-temper type chocolate is widely used in the chocolate industry because of its convenience. The hard butter used in non-temper type chocolate can be roughly classified as a non-lauric cocoa butter replacer (CBR) having a relatively high compatibility with cocoa butter or a lauric cocoa butter substitute (CBS) having a significantly low compatibility with cocoa butter.

The compatibility of a cocoa butter alternative (CBA) with cocoa butter is represented by a maximum proportion of cocoa butter that can be blended into a fats/oils phase of chocolate containing a cocoa butter alternative and cocoa butter. That is, if the amount of cocoa butter blended into the fats/oils phase of chocolate is within the compatibility range, the chocolate can maintain its quality for a long time without the occurrence of bloom. Therefore, since a larger amount of cacao mass or cocoa powder containing cocoa butter can be blended in as the compatibility is higher, the chocolate has a favorable cacao flavor.

The compatibility of a conventional high trans fatty acid type CBR with cocoa butter was about 15 to 20%. However, in recent years, there have been concerns about the nutritional disadvantages of trans fatty acids. In order to avoid this problem, zero trans fatty acid type CBRs (for example, Japanese Patent Laid-Open No. 2009-284899, Published Japanese Translation No. 2010-532802 of the PCT International Publication, Published Japanese Translation No. 2010-532803 of the PCT International Publication and WO2012/002373) have been developed. However, these zero trans fatty acid type CBRs have problems of a low compatibility of about 15%, a low solidification rate, and a poor melting feeling in the mouth.

On the other hand, CBS has a favorable melting feeling in the mouth equivalent to that of cocoa butter and has a high solidification rate equivalent to that of temper type chocolate. However, since the compatibility is extremely low at about 5%, CBS has a problem that an authentic cacao flavor cannot be obtained.

CITATION LIST

Patent Literature

[Patent Literature 1]
Japanese Patent Laid-Open No. 2009-284899
[Patent Literature 2]
Published Japanese Translation No. 2010-532802 of the PCT International Publication
[Patent Literature 3]
Published Japanese Translation No. 2010-532803 of the PCT International Publication
[Patent Literature 4]
WO2012/002373

SUMMARY OF INVENTION

Technical Problem

Therefore, it has been required to develop non-temper type chocolate which can contain a large amount of cocoa butter and cacao mass or cocoa powder containing cocoa butter and in which the occurrence of bloom is prevented.

An object of the present invention is to provide an oily food such as chocolate or cream in which the occurrence of bloom and the like is suppressed even if a large amount of cocoa butter is blended in and which does not require a tempering treatment.

Solution to Problem

The inventors conducted extensive studies in order to address the above problems, and as a result, found that, when a specific amount of HMM, HLM, HLL, HHM and HHL is contained in fats/oils of an oily food according to the content of SOS, the above problems can be addressed. Thereby, the present invention was completed.

Specifically, the present invention may include the following aspects.

[1] An oily food containing fats/oils in a continuous phase, wherein the fats/oils contain SOS, HMM, HLM, HLL, HHM and HHL, the mass ratio (HLM/HLL) of the content of HLM to the content of HLL is 1.0 or more, the mass ratio (HMM+HLM+HLL+HHM+HHL)/SOS of the total content (HMM+HLM+HLL+HHM+HHL) of HMM, HLM, HLL, HHM and HHL to the content of SOS is 0.9 to 8, the proportion of fatty acids having 20 or more carbon atoms with respect to the total amount of constituent fatty acids H in the above HMM, HLM, HLL, HHM and HHL is less than 3% by mass, (where S, O, H, M, L, SOS, HMM, HLM, HLL, HHM and HHL have the following meanings, S: saturated fatty acids having 16 to 24 carbon atoms,
O: oleic acid, H: saturated fatty acids having 14 to 24 carbon atoms,
M: fatty acids having 6 to 10 carbon atoms,
L: lauric acid,
SOS: triacylglycerols in which S is ester-bonded at positions 1 and 3 and O is ester-bonded at position 2 of glycerol,
HMM: triacylglycerols in which 1 molecule of H and 2 molecules of M are ester-bonded to glycerol,
HLM: triacylglycerols in which 1 molecule of each of H, L and M is ester-bonded to glycerol,
HLL: triacylglycerols in which 1 molecule of H and 2 molecules of L are ester-bonded to glycerol,
HHM: triacylglycerols in which 2 molecules of H and 1 molecule of M are ester-bonded to glycerol,
HHL: triacylglycerols in which 2 molecules of H and 1 molecule of L are ester-bonded to glycerol).

[2] The oily food according to [1], wherein the content of HLL is larger than the content of HMM (HLL>HMM).

[3] The oily food according to [1] or [2], wherein the content of HHL is larger than the content of HHM (HHL>HHM).

[4] The oily food according to any one of [1] to [3], wherein a ratio (HMM+HLM+HLL)/(HHM+HHL) of the total content (HMM+HLM+HLL) of HMM, HLM and HLL to the total content (HHM+HHL) of HHM and HHL is 0.7 to 1.3.

[5] The oily food according to any one of [1] to [4], wherein the content of C24 to 30 of the fats/oils is 0.3 to 6% by mass (where C24 to 30: triacylglycerols in which a total number of carbon atoms of three fatty acids ester-bonded to glycerol is 24 to 30).

[6] The oily food according to any one of [1] to [5], wherein the fats/oils include cocoa butter.

[7] The oily food according to any one of [1] to [6], wherein the fats/oils include transesterified fats/oils containing 2 to 30% by mass of medium-chain fatty acid triacylglycerol, 30 to 95% by mass of lauric fats/oils and 0 to 60% by mass of non-lauric fats/oils as raw fats/oils.

[8] A method of producing the oily food containing fats/oils in a continuous phase according to any one of [1] to [7], the method including
adjusting a mass ratio (HMM+HLM+HLL+HHM+HHL)/SOS of the total content (HMM+HLM+HLL+HHM+HHL) of HMM, HLM, HLL, HHM and HHL to the content of SOS contained in the fats/oils to 0.9 to 8 using at least cocoa butter and transesterified fats/oils, wherein the transesterified fats/oils contain 2 to 30% by mass of medium-chain fatty acid triacylglycerol, 30 to 95% by mass of lauric fats/oils and 0 to 60% by mass of non-lauric fats/oils as raw fats/oils.

Advantageous Effects of Invention

According to the present invention, it is possible to provide an oily food such as chocolate or cream in which the occurrence of bloom and the like is suppressed even if a large amount of cocoa butter is blended in and which does not require a tempering treatment. In particular, it is possible to provide an oily food suitable for molding.

DESCRIPTION OF EMBODIMENTS

Hereinafter, the oily food of the present invention will be described in order.

Here, in the present invention, A to B means A or more and B or less. For example, A to B % by mass means A % by mass or more and B % by mass or less.

The oily food of the present invention is a food in which fats/oils are in a continuous phase. Specific examples include chocolate, fat cream, butter cream, and spreads. The fats/oils contained in the oily food of the present invention include SOS, HMM, HLM, HLL, HHM and HHL. Here, S, O, H, M, L, SOS, HMM, HLM, HLL, HHM and HHL have the following meanings. S refers to saturated fatty acids having 16 to 24 carbon atoms, which are preferably linear. S is preferably saturated fatty acids having 16 to 20 carbon atoms and more preferably saturated fatty acids having 16 to 18 carbon atoms. O refers to oleic acid. H refers to saturated fatty acids having 14 to 24 carbon atoms, which are preferably linear. M refers to saturated fatty acids having 6 to 10 carbon atoms, which are preferably linear. L refers to lauric acid. SOS refers to triacylglycerols in which S is ester-bonded at positions 1 and 3 and O is ester-bonded at position 2 of glycerol. HMM refers to triacylglycerols in which 1 molecule of H and 2 molecules of M are ester-bonded to glycerol. HLM refers to triacylglycerols in which 1 molecule of each of H, L and M is ester-bonded to glycerol. HLL refers to triacylglycerols in which 1 molecule of H and 2 molecules of L are ester-bonded to glycerol. HHM refers to triacylglycerols in which 2 molecules of H and 1 molecule of M are ester-bonded to glycerol. HHL refers to triacylglycerols in which 2 molecules of H and 1 molecule of L are ester-bonded to glycerol. In HMM, HLM, HLL, HHM and HHL, bonding positions of constituent fatty acids on glycerol are arbitrary.

In the fats/oils contained in the oily food of the present invention, the mass ratio (HLM/HLL) of the content of HLM to the content of HLL is 1.0 or more. HLM/HLL is preferably 1.2 to 2.0, and more preferably 1.3 to 1.7. When HLM/HLL is within the above range, the occurrence of bloom and grain is effectively suppressed even if SOS is contained in fats/oils forming a continuous phase of the oily food.

In the fats/oils contained in the oily food of the present invention, the mass ratio (HMM+HLM+HLL+HHM+HHL)/SOS of the total content (HMM+HLM+HLL+HHM+HHL) of the above HMM, HLM, HLL, HHM and HHL to the content of SOS is 0.9 to 8. (HMM+HLM+HLL+HHM+HHL)/SOS is preferably 1.2 to 4, more preferably 1.4 to 3, and still more preferably 1.6 to 2.7. When (HMM+HLM+HLL+HHM+HHL)/SOS is within the above range, the occurrence of bloom and grain is suppressed even if SOS is contained in fats/oils forming a continuous phase of the oily food. In addition, when (HMM+HLM+HLL+HHM+HHL)/SOS is within the above range, the oily food has an excellent melting feeling in the mouth.

The total content (SOS+HMM+HLM+HLL+HHM+HHL) of SOS, HMM, HLM, HLL, HHM and HHL in fats/oils contained in the oily food of the present invention is preferably 10 to 98% by mass. SOS+HMM+HLM+HLL+HHM+HHL is more preferably 30 to 95% by mass, still more preferably 40 to 90% by mass, and most preferably 50 to 85% by mass. The total content of SOS, HMM, HLM, HLL, HHM and HHL may be appropriately changed according to physical properties required for oily foods. In particular, in the case of molded oily foods, SOS+HMM+HLM+HLL+HHM+HHL is preferably 65 to 85% by mass.

For the above HMM and HLL in fats/oils contained in the oily food, the content of HLL is preferably larger than the content of HMM (HLL>HMM). In addition, for the above HHM and HHL in fats/oils contained in the oily food, the content of HHL is preferably larger than the content of HHM (HHL>HHM). When HLL>HMM and/or HHL>HHM are satisfied, even if SOS is contained in fats/oils forming a continuous phase of the oily food, the occurrence of bloom and grain is effectively suppressed.

In addition, for the above HMM, HLM, HLL, HHM and HHL in fats/oils contained in the oily food, the ratio (HMM+HLM+HLL)/(HHM+HHL) of the total content (HMM+HLM+HLL) of HMM, HLM and HLL to the total content (HHM+HHL) of HHM and HHL is preferably 0.7 to 1.3. (HMM+HLM+HLL)/(HHM+HHL) is more preferably 0.9 to 1.2, and still more preferably 1.0 to 1.2. When (HMM+HLM+HLL)/(HHM+HHL) is within the above range, even if SOS is contained in fats/oils forming a continuous phase of the oily food, the occurrence of bloom and grain is effectively suppressed.

The total content (HMM+HLM+HLL) of the above HMM, HLM and HLL in fats/oils contained in the oily food of the present invention is preferably 6 to 40% by mass, more preferably 9 to 35% by mass, and still more preferably 11 to 30% by mass. The total content (HHM+HHL) of the above HHM and HHL in fats/oils contained in the oily food of the present invention is preferably 4 to 32% by mass, more preferably 7 to 28% by mass, and still more preferably 9 to 26% by mass. In particular, in the case of molded oily foods, HMM+HLM+HLL is preferably 22 to 32% by mass, and HHM+HHL is preferably 20 to 30% by mass.

In addition, in the above HMM, HLM, HLL, HHM and HHL, the proportion of fatty acids having 20 or more carbon atoms with respect to the total amount of constituent fatty acids H is less than 3% by mass. The proportion is more preferably less than 2% by mass, and still more preferably 0 to 1.4% by mass. In HMM, HLM, HLL, HHM and HHL, when the proportion of fatty acids having 20 or more carbon atoms with respect to the total amount of constituent fatty acids H is within the above range, even if SOS is contained in fats/oils forming a continuous phase of the oily food, the occurrence of bloom and grain is effectively suppressed.

The fats/oils contained in the oily food of the present invention preferably contain 0.3 to 6% by mass of C24 to 30. Here, C24 to 30 are triacylglycerols in which a total number of carbon atoms of three fatty acids ester-bonded to glycerol is 24 to 30. For example, tricaprylin is a triacylglycerol in which 3 molecules of caprylic acid are ester-bonded to glycerol and the total number of carbon atoms of fatty acids is 24. Similarly, tricaprin has a total number of carbon atoms of fatty acids of 30. For example, if fats/oils contained in the oily food include 2% by mass of tricaprylin and 3% by mass of tricaprin, the content of C24 to 30 of the fat/oil composition is 5% by mass. The constituent fatty acids of C24 to 30 are preferably a combination of saturated fatty acids having 8 to 12 carbon atoms. The proportion of C24 to 30 in fats/oils contained in the oily food of the present invention is preferably 0.5 to 5% by mass, more preferably 0.8 to 4% by mass, and still more preferably 2 to 4% by mass. When the proportion of C24 to 30 in the fats/oils contained in the oily food is within the above range, the oily food has favorable gloss.

The content of triacylglycerols in the fats/oils contained in the oily food of the present invention can be measured according to, for example, a gas chromatography method (Journal of the American Oil Chemists' Society (JAOCS), vol 70, 11, 1111-1114 (1993), etc.). In order to determine the content of symmetric triacylglycerols such as SOS, first, the content of S2O is measured by the gas chromatography method. Then, the ratio of SOS/S2O is measured by a method according to, for example, J. High Resol. Chromatogr., 18, 105-107 (1995), and the content of symmetric triacylglycerols can be calculated based on this value and the content of S2O. S2O refers to triacylglycerols in which 2 molecules of S and 1 molecule of O are ester-bonded to glycerol. If necessary, a calculation method known in the field may be applied to determine the content of triacylglycerols in fats/oils contained in the oily food of the present invention. In addition, constituent fatty acids of fats/oils contained in the oily food of the present invention can be measured according to, for example, a gas chromatography method (American Oil Chemists' Society (AOCS), Ce1f-96 or the like).

For the fats/oils contained in the oily food of the present invention, any edible fats/oils may be used as raw fats/oils as long as the above conditions (the fats/oils contain SOS, HMM, HLM, HLL, HHM and HHL, HLM/HLL is 1.0 or more, (HMM+HLM+HLL+HHM+HHL)/SOS is 0.9 to 8, and in HMM, HLM, HLL, HHM and HHL, the proportion of fatty acids having 20 or more carbon atoms in the total amount of constituent fatty acids H is less than 3% by mass) are satisfied. Examples of raw material fats/oils include various vegetable fats/oils and animal fats/oils including soybean oil, rapeseed oil, corn oil, cottonseed oil, rice oil, sunflower oil, safflower oil, sesame oil, cocoa butter, shea fat, sal fat, palm oil, palm kernel oil, coconut oil, beef tallow, lard, milk fat, fish oil, and whale oil. Examples of raw fats/oils include processed fats/oils obtained by applying one or two or more treatments selected from among hydrogenation, fractionation, and transesterification to mixed fats/oils including one, two or more of these vegetable fats/oils and animal fats/oils. For the fats/oils contained in the oily food of the present invention, one or more of the edible fats/oils may be used in combination therewith.

The oily food of the present invention may contain cocoa butter as a supply source of the above SOS. The oily food of the present invention exhibits a strong cacao flavor because a large amount of cocoa butter can be used without performing a special tempering treatment or the like. The content of cocoa butter in the fats/oils contained in the oily food is preferably 3 to 55% by mass, more preferably 10 to 50% by mass, still more preferably 15 to 45% by mass, yet more preferably 20 to 42% by mass, and most preferably 25 to 40% by mass. Here, regarding the SOS supply source, fats/oils rich in SOS (fats/oils containing 40% by mass or more and preferably 60% by mass or more of SOS) may be used. Examples of fats/oils rich in SOS (hereinafter also referred to as SOS fats/oils) include cocoa butter, palm oil, shea fat, sal fat, allanblackia fat, mowrah fat, illipe fat, and mango kernel oil, and their fractionated oils. Moreover, as already known, SOS fats/oils may be fats/oils obtained by transesterifying a mixture containing palmitic acid, stearic acid, or its lower alcohol esters and high oleic acid fats/oils such as high oleic sunflower oil using lipase preparation with selectivity at positions 1 and 3. In addition, the SOS fats/oils may be fats/oils obtained by fractionating the obtained transesterified fats/oils.

Regarding the supply source of the above HMM, HLM, HLL, HHM and HHL, the oily food of the present invention may contain transesterified fats/oils including medium-chain fatty acid triacylglycerol, lauric fats/oils and non-lauric fats/oils as raw fats/oils. Here, medium-chain fatty acid triacylglycerols (hereinafter referred to as MCT) are composed of fatty acids having 6 to 10 carbon atoms. That is, MCT refers to triacylglycerols in which 3 molecules of fatty acids having 6 to 10 carbon atoms are ester-bonded to glycerol. The content of fatty acids having 6 carbon atoms with respect to the total amount of constituent fatty acids of MCT is preferably 10% by mass or less and more preferably 0 to 5% by mass. In addition, the content of fatty acids having 10 carbon atoms with respect to the total amount of constituent fatty acids of MCT is preferably 10% by mass or more, more preferably 20 to 100% by mass, and still more preferably 40 to 80% by mass. MCT preferably includes caprylic acid and capric acid as constituent fatty acids.

In addition, here, the lauric fats/oils are fats/oils in which the content of lauric acid with respect to the total amount of constituent fatty acids is 30% by mass or more (preferably 40% by mass or more). Examples of lauric fats/oils include coconut oil, palm kernel oil, and fractionated oils such as palm kernel olein and palm kernel stearin obtained by fractionating them. In addition, examples thereof include fats/oils obtained by transesterification using them and hardened oils thereof (for example, extremely hardened palm kernel oil and extremely hardened palm kernel stearin oil). Two or more lauric fats/oils may be used in combination.

In addition, here, the non-lauric fats/oils are fats/oils in which the content of fatty acids having 16 or more carbon atoms with respect to the total amount of constituent fatty acids is 90% by mass or more. Examples of non-lauric fats/oils include rapeseed oil, soybean oil, corn oil, safflower oil, cottonseed oil, sunflower oil, cocoa butter, shea fat, sal fat, and palm oil. In addition, processed fats/oils obtained by applying one or two or more treatments selected from among hydrogenation, fractionation, and transesterification thereto may be exemplified. Two or more non-lauric fats/oils may be used in combination. In the non-lauric fats/oils, extremely hardened oil and/or palm stearin is preferably used. In addition, in the non-lauric fats/oils, a combination of extremely hardened oil and/or palm stearin and fats/oils containing 70% by mass or more (preferably 80% by mass or more) of unsaturated fatty acids as constituent fatty acids may be used.

The transesterified fats/oils include, as raw fats/oils, preferably 2 to 30% by mass, 30 to 95% by mass and 0 to 60% by mass, more preferably 3 to 25% by mass, 40 to 80% by mass and 10 to 50% by mass, and still more preferably 4 to 22% by mass, 45 to 70% by mass and 20 to 45% by mass of MCT, lauric fats/oils and non-lauric fats/oils, respectively. In the non-lauric fats/oils, which are one of raw fats/oils for the transesterified fats/oils, the proportion of fats/oils containing 70% by mass or more of unsaturated fatty acids is preferably 0 to 50% by mass, more preferably 0 to 40% by mass, and still more preferably 0 to 30% by mass.

In addition, raw fats/oils may be mixed into the transesterified fats/oils so that the following conditions (i) to (iii) are satisfied.
  (i) The content of saturated fatty acids having 8 to 10 carbon atoms with respect to the total amount of fatty acids constituting fats/oils is 4 to 26% by mass.
  (ii) The content of saturated fatty acids having 12 to 14 carbon atoms with respect to the total amount of fatty acids constituting fats/oils is 20 to 60% by mass.
  (iii) The content of saturated fatty acids having 16 to 24 carbon atoms with respect to the total amount of fatty acids constituting fats/oils is 25 to 55% by mass.

In addition, in the transesterified fats/oils, the content of the saturated fatty acids having 20 or more carbon atoms with respect to the total amount of the fatty acids constituting fats/oils is preferably less than 2% by mass, more preferably 1.4% by mass or less, and still more preferably 0 to 1.0% by mass. The transesterified fats/oils have excellent anti-bloom and anti-grain effects even if the content of the saturated fatty acids having 20 or more carbon atoms with respect to constituent fatty acids is 0% by mass or a very small amount.

In addition, the content (condition (i)) of the saturated fatty acids having 8 to 10 carbon atoms that raw fats/oils of the transesterified fats/oils make up is more preferably 12 to 26% by mass, still more preferably 13 to 25% by mass, and yet more preferably 14 to 24% by mass. The saturated fatty acids having 8 to 10 carbon atoms are preferably caprylic acid or capric acid. In addition, the content (condition (ii)) of the saturated fatty acids having 12 to 14 carbon atoms is more preferably 30 to 50% by mass, and still more preferably 35 to 45% by mass. The saturated fatty acids having 12 to 14 carbon atoms are preferably lauric acid or myristic acid. In addition, the content (condition (iii)) of the saturated fatty acids having 16 to 24 carbon atoms is more preferably 30 to 53% by mass, and still more preferably 35 to 48% by mass. The saturated fatty acids having 16 to 24 carbon atoms are preferably linear. The saturated fatty acids having 16 to 24 carbon atoms are preferably palmitic acid, stearic acid, arachidic acid or behenic acid, and more preferably palmitic acid or stearic acid.

A transesterification method used for producing the transesterified fats/oils is not particularly limited. A general transesterification method can be used. The transesterified fats/oils of the present invention can be produced using any method of chemical transesterification using a synthetic catalyst such as sodium methoxide and enzymatic transesterification using a lipase as a catalyst. Regarding transesterification, preferably, random transesterification without regiospecificity can be applied.

One preferable mode of the fats/oils contained in the oily food of the present invention is a mode including the SOS fats/oils and the transesterified fats/oils at a ratio of 1:9 to 1:0.7. In addition, parts of the fats/oils contained in the oily food other than SOS fats/oils and transesterified fats/oils may be the above edible fats/oils generally used for food. In particular, the edible fats/oils may be lauric fats/oils such as coconut oil, palm kernel oil, and their fractionated oils, or may be liquid oils such as soybean oil, rapeseed oil, and sunflower oil. Here, the lauric fats/oils are as described above, and the liquid oils are fats/oils having fluidity at 10° C. and preferably non-lauric fats/oils. The fats/oils contained in the oily food of the present invention contain the SOS fats/oils and the transesterified fats/oils more preferably at a ratio of 1:6 to 1:1, sill more preferably at a ratio of 1:4 to 1:1.3, and most preferably at a ratio of 1:3 to 1:1.5. In addition, the proportion of the SOS fats/oils and the transesterified fats/oils in the fats/oils contained in the oily food of the present invention is preferably 20 to 100% by mass, more preferably 40 to 100% by mass, and still more preferably 50 to 100% by mass.

The fats/oils contained in the oily food of the present invention also include fats/oils (cocoa butter, milk fat, etc.) contained in raw materials (cacao mass, cocoa powder, whole milk powder, etc.) in addition to fats/oils blended as raw materials such as cocoa butter and cocoa butter alternatives (CBA). For example, generally, the content of fats/oils (cocoa butter) of cacao mass is 55% by mass (oil content of 0.55), the content of fats/oils (cocoa butter) of cocoa powder is 11% by mass (oil content of 0.11), and the content of fats/oils (milk fat) of whole milk powder is 25% by mass (oil content of 0.25). Therefore, the content of fats/oils contained in the oily food is a value of a sum of those obtained by multiplying blending amounts (% by mass) of respective raw materials in the oily food by the oil content. The content of the fats/oils contained in the oily food of the present invention is preferably 10 to 100% by mass, more preferably 20 to 100% by mass, and still more preferably 30 to 100% by mass.

For health reasons, the content of trans fatty acids of the oily food of the present invention is preferably 0 to 5% by mass, more preferably 0 to 3% by mass, and still more preferably 0 to 1% by mass.

One preferable mode of the oily food of the present invention is chocolate.

The chocolate in the present invention is not limited to chocolate as defined in "Fair Competition Code Concerning Labeling for chocolates" (the National Chocolate Industry Fair Trade Association) or regulations. The chocolate in the present invention contains edible fats/oils and sugars as main raw materials. If necessary, cacao components (cacao mass, cocoa powder, etc.), dairy products, flavors, emulsifiers, and the like are added to the main raw materials. This chocolate is produced through all or some of chocolate producing processes (a mixing process, a refining process, a conching process, a molding process, a cooling process, and the like). In addition, the chocolate in the present invention includes white chocolate and colored chocolate in addition to dark chocolate and milk chocolate. In addition, the chocolate in the present invention includes pasty or creamy chocolate.

The chocolate of the present invention preferably contains 25 to 65% by mass of fats/oils. The content of the fats/oils contained in the chocolate of the present invention is more preferably 28 to 55% by mass, and still more preferably 30 to 50% by mass. In addition, the total content of SOS, HMM, HLM, HLL, HHM and HHL (SOS+HMM+HLM+HLL+HHM+HHL) with respect to fats/oils contained in the chocolate of the present invention is preferably 30 to 98% by mass, more preferably 40 to 95% by mass, still more preferably 50 to 90% by mass, and most preferably 60 to 85% by mass.

The fats/oils contained in the chocolate of the present invention may contain, if necessary, hard butter used in non-temper type chocolate, as long as conditions in which the fats/oils contain SOS, HMM, HLM, HLL, HHM and HHL, HLM/HLL is 1.0 or more, (HMM+HLM+HLL+HHM+HHL)/SOS is 0.9 to 8, and in HMM, HLM, HLL, HHM and HHL, the proportion of fatty acids having 20 or more carbon atoms in the total amount of constituent fatty acids H is less than 3% by mass are satisfied. The hard butter has a melting property similar to that of cocoa butter, but has a completely different fat/oil structure. The hard butter is roughly classified as a lauric acid type (CBS) or a non-lauric acid type (CBR).

Regarding the lauric acid type hard butter (CBS), typically, fats/oils in which a hard part (palm kernel stearin) obtained by fractionating palm kernel oil is extremely hardened by hydrogenation are known. The non-lauric acid type hard butter (CBR) is also referred to as trans fatty acid type hard butter. Regarding CBR, typically, fats/oils obtained by performing isomerization and hydrogenation on a liquid oil such as low-melting-point palm olein or soybean oil, and fats/oils of a high-melting-point part or an intermediate-melting-point part obtained by, if necessary, fractionating the fats/oils on which isomerization and hydrogenation are performed are known. In addition, the non-lauric acid type hard butter may contain transesterified fats/oils. The fats/oils contained in the chocolate of the present invention may contain preferably 0 to 80% by mass, more preferably 0 to 65% by mass, and still more preferably 0 to 50% by mass of the hard butter used in the above non-temper type chocolate.

The fats/oils contained in the chocolate of the present invention may contain, if necessary, lauric fats/oils and/or a liquid oil, as long as conditions in which the fats/oils contain SOS, HMM, HLM, HLL, HHM and HHL, HLM/HLL is 1.0 or more, (HMM+HLM+HLL+HHM+HHL)/SOS is 0.9 to 8, and in HMM, HLM, HLL, HHM and HHL, the proportion of fatty acids having 20 or more carbon atoms with respect to the total amount of constituent fatty acids H is less than 3% by mass are satisfied. When lauric fats/oils and/or liquid oils are contained, chocolate or chocolate cream with a soft texture can be obtained. Here, the lauric fats/oils and liquid oils are as described above. In order to obtain chocolate or chocolate cream with a soft texture, the fats/oils contained in the chocolate of the present invention may contain preferably 0 to 80% by mass, more preferably 0 to 65% by mass, and still more preferably 0 to 50% by mass of the lauric fats/oils and/or liquid oils.

The chocolate of the present invention preferably contains sugars in addition to fats/oils. Examples of sugars include sucrose (granulated sugar and powdered sugar), lactose, glucose, fructose, maltose, reduced starch saccharified product, sugar syrup, enzyme-converted starch syrup, isomerized sugar syrup, sucrose-bonded starch syrup, reducing sugar polydextrose, oligosaccharide, sorbitol, reduced lactose, trehalose, xylose, xylitol, maltitol, erythritol, mannitol, raffinose, and dextrin. The content of sugars in the chocolate of the present invention is preferably 20 to 60% by mass, more preferably 25 to 55% by mass, and still more preferably 30 to 50% by mass.

In the chocolate of the present invention, in addition to fats/oils and sugars, raw materials that are generally blended into chocolate can be used. Specifically, for example, dairy products such as whole milk powder and skim milk powder, cacao components such as cacao mass and cocoa powder, various powders such as soy powder, soy proteins, processed fruit products, processed vegetable products, tea powder, and coffee powder, gums, starches, emulsifiers, antioxidants, coloring agents, and flavors can be used.

The chocolate of the present invention can be produced by a conventionally known method. When the chocolate of the present invention is produced, for example, fats/oils, cacao components, sugars, dairy products, and emulsifiers can be used as raw materials. The chocolate of the present invention can be produced through a mixing process, a refining process, a conching process, a cooling process, and the like. The chocolate of the present invention is preferably chocolate that does not require a tempering treatment.

Even if the chocolate of the present invention contains a large amount of cocoa butter, the occurrence of bloom and grain is suppressed. The chocolate of the present invention can be used for all chocolate applications. The chocolate can be used as not only bar type or block type chocolate that is eaten without change but also raw materials for confectionery and baking. For example, the chocolate of the present invention is suitable for use in chocolate chips to be mixed into confectionery and bread dough, coating of bakery products, and fillings. The chocolate of the present invention is particularly suitable for molding because it has a relatively soft texture and is easily released from the mold.

EXAMPLES

Next, the present invention will be described with reference to examples. However, the present invention is no limited to these examples.

[Analysis Method]

The content of each triacylglycerol (SOS, HMM, HLM, HLL, HHM, HHL, C24 to 30, etc.) contained in fats/oils was measured according to a gas chromatography method (JAOCS, vol 70, 11, 1111-1114 (1993) and a silver ion chromatography method (J. High Resol. Chromatogr., 18, 105-107 (1995)). Constituent fatty acids of the fats/oils were measured according to a gas chromatography method (AOCSCelf-96).

[Preparation of Raw Fats/Oils]
(SOS Fats/Oils)
SOS-1: Cocoa Butter (SOS Content of 86.2% by Mass) was Used as SOS-1.
(Transesterified Fats/Oils)
IE-1: mixed fats/oils containing 15 parts by mass of MCT1, 60 parts by mass of extremely hardened palm kernel oil and 25 parts by mass of extremely hardened rapeseed oil were transesterified using sodium methoxide as a catalyst. The obtained transesterified fats/oils were bleached and deodorized to obtain IE-1.
IE-2: mixed fats/oils containing 3 parts by mass of MCT1, 57 parts by mass of coconut oil, 30 parts by mass of palm stearin and 10 parts by mass of extremely hardened high erucic acid rapeseed oil were transesterified using sodium methoxide as a catalyst. The obtained transesterified fats/oils were bleached and deodorized to obtain IE-2.
IE-3: mixed fats/oils containing 49 parts by mass of extremely hardened palm kernel oil, 35 parts by mass of palm oil intermediate-melting-point fraction, 15 parts by mass of palm stearin and 1 part by mass of extremely hardened palm oil were transesterified using sodium methoxide as a catalyst. The obtained transesterified fats/oils were bleached and deodorized to obtain IE-3.
IE-4: mixed fats/oils containing 49 parts by mass of MCT1 and 51 parts by mass of extremely hardened rapeseed oil were transesterified using sodium methoxide as a catalyst. The obtained transesterified fats/oils were bleached and deodorized to obtain IE-4.
(Other Fats/Oils)
Liquid Oil-1: Rapeseed Oil was Used as Liquid Oil-1

Here, for the above MCT1, MCT (commercially available from The Nisshin OilliO Group, Ltd.) in which fatty acids constituting triacylglycerols were caprylic acid (having 8 carbon atoms) and capric acid (having 10 carbon atoms) and a mass ratio therebetween was 30:70 was used.

[Preparation and Evaluation of Chocolate]
Based on raw material formulations in Table 1, chocolates of Example 1 and Comparative Examples 1 to 3 were prepared according to a general method. That is, the melted chocolate obtained through a raw material mixing process, a refining process, and a conching process was poured into a 120 g mold without a tempering treatment and cooled and solidified at 8° C. After cooling and solidifying, the chocolate was removed from the mold to obtain 5 g of chocolate of each of Example 1 and Comparative Examples 1 to 3. For each chocolate of Example 1 and Comparative Examples 1 to 3, according to the following criteria, the releasability and a melting feeling in the mouth were evaluated and it was checked whether bloom occurred after storage at temperatures of 10° C., 15° C. and 20° C. The results are shown in Table 1.

TABLE 1

Raw material formulations of chocolate and evaluations results

| Raw material formulations of chocolate (mass %) | Example 1 | Comparative Example 1 | Comparative Example 2 | Comparative Example 3 |
|---|---|---|---|---|
| SOS fats/oils-1 | 0.65 | 0.65 | 0.65 | 0.65 |
| IE-1 | 25.09 | — | — | — |
| IE-2 | — | 25.09 | — | — |
| IE-3 | — | — | 25.09 | — |
| IE-4 | — | — | — | 25.09 |
| Cacao mass | 16.34 | 16.34 | 16.34 | 16.34 |
| Cocoa powder | 10.23 | 10.23 | 10.23 | 10.23 |
| Skim milk powder | 5.95 | 5.95 | 5.95 | 5.95 |
| Granulated sugar | 28.30 | 28.30 | 28.30 | 28.30 |
| Lactose | 12.90 | 12.90 | 12.90 | 12.90 |
| Lecithin | 0.50 | 0.50 | 0.50 | 0.50 |
| Flavor | 0.04 | 0.04 | 0.04 | 0.04 |
| Sum | 100 | 100 | 100 | 100 |
| Content of fats/oils of chocolate (mass %) | 35.8 | 35.8 | 35.8 | 35.8 |
| Content of trans fatty acids of chocolate (mass %) | less than 0.5 | less than 0.5 | less than 0.5 | less than 0.5 |
| Composition of fats/oils of chocolate (numerical values other than ratio are content (unit: mass %)) | | | | |
| Cocoa butter | 30.0 | 30.0 | 30.0 | 30.0 |
| SOS | 25.9 | 26.8 | 28.0 | 25.9 |
| HMM | 5.1 | 2.4 | 0.2 | 29.6 |
| HLM | 13.4 | 8.8 | 2.0 | 0.0 |
| HLL | 8.8 | 7.9 | 6.2 | 0.0 |

TABLE 1-continued

Raw material formulations of chocolate and evaluations results

| Raw material formulations of chocolate (mass %) | Example 1 | Comparative Example 1 | Comparative Example 2 | Comparative Example 3 |
|---|---|---|---|---|
| HHM | 10.9 | 8.1 | 2.1 | 21.6 |
| HHL | 14.3 | 14.1 | 13.1 | 0.0 |
| HLM/HLL | 1.5 | 1.1 | 0.3 | — |
| (HMM + HLM + HLL + HHM + HHL)/SOS | 2.0 | 1.5 | 0.8 | 2.0 |
| (HMM + HLM + HLL)/(HHM + HHL) | 1.1 | 0.9 | 0.6 | 1.4 |
| C24 to 30 | 2.7 | 1.4 | 0.1 | 13.1 |
| Fatty acids having 20 or more carbon atoms with respect to total amount of H | 1.2 | 7.5 | 1.3 | 2.8 |
| Evaluation results | | | | |
| Releasability | ◎ | ◎ | Δ | X |
| Melting feeling in the mouth | ◎ | ◎ | ◎ | Δ |
| Anti-bloom | | | | |
| 10° C. | ◎ | Δ | Δ | ◎ |
| 15° C. | ◎ | X | X | ◎ |
| 20° C. | ◎ | X | X | ◎ |

[Evaluation of Releasability]

The melted chocolate filled into the mold was cooled at 8° C. and a time (minute) required for releasing 90% or more was then measured, and evaluation was performed according to the following criteria.
Shorter than 20 minutes ◎: good
20 minutes or longer and shorter than 30 minutes O: fair
30 minutes or longer and shorter than 40 minutes Δ: slightly late, poor
40 minutes or longer x: very late, poor

[Evaluation of Melting Feeling in the Mouth]
◎: Very good
O: Good
Δ: Fair
x: Poor

[Evaluation of Anti-Bloom]

After the released chocolates were stored at temperatures of 10° C., 15° C. and 20° C., the number of days it took for bloom to occur was visually checked.

2 months or longer ◎: good
1 month or longer and shorter than 2 months O: fair
1 week or longer and shorter than 1 month Δ: somewhat poor
Shorter than 1 week x: poor

[Preparation and Evaluation of Chocolate Cream]

Based on raw material formulations in Table 2, chocolate creams of Examples 2 and 3 and Comparative Examples 4 and 5 were prepared according to a general method. That is, the melted chocolate obtained through a raw material mixing process, a refining process, and a conching process was poured into a 60 cc cup without a tempering treatment and cooled and solidified at 8° C. After cooling and solidifying, for the chocolate creams of Examples 2 and 3 and Comparative Examples 4 and 5, according to the following criteria, a melting feeling in the mouth was evaluated and it was checked whether bloom after storage at temperatures of 8° C. and 20° C. has occurred. The results are shown in Table 2.

TABLE 2

Raw material formulations of chocolate cream and evaluations results

| Raw material formulations of chocolate cream (mass %) | Example 2 | Example 3 | Comparative Example 4 | Comparative Example 5 |
|---|---|---|---|---|
| IE-1 | 21.50 | 14.34 | — | — |
| IE-3 | — | — | 21.50 | 14.34 |
| Liquid oil | 7.17 | 14.33 | 7.17 | 14.33 |
| Cacao mass | 11.00 | 11.00 | 11.00 | 11.00 |
| Cocoa powder | 10.18 | 10.18 | 10.18 | 10.18 |
| Skim milk powder | 5.91 | 5.91 | 5.91 | 5.91 |
| Granulated sugar | 30.80 | 30.80 | 30.80 | 30.80 |
| Lactose | 12.90 | 12.90 | 12.90 | 12.90 |
| Lecithin | 0.50 | 0.50 | 0.50 | 0.50 |
| Flavor | 0.04 | 0.04 | 0.04 | 0.04 |
| Sum | 100 | 100 | 100 | 100 |
| Content of fats/oils of chocolate (mass %) | 35.8 | 35.8 | 35.8 | 35.8 |
| Content of trans fatty acids of chocolate (mass %) | less than 0.5 | less than 0.5 | less than 0.5 | less than 0.5 |
| Composition of fats/oils of chocolate (content except for numerical value or ratio (unit: mass %)) | | | | |
| Cocoa butter | 20.0 | 20.0 | 20.0 | 20.0 |
| SOS | 17.2 | 17.2 | 19.1 | 18.5 |
| HMM | 4.4 | 2.9 | 0.1 | 0.1 |

TABLE 2-continued

Raw material formulations of chocolate cream and evaluations results

| Raw material formulations of chocolate cream (mass %) | Example 2 | Example 3 | Comparative Example 4 | Comparative Example 5 |
|---|---|---|---|---|
| HLM | 11.5 | 7.7 | 1.7 | 1.1 |
| HLL | 7.5 | 5.0 | 5.4 | 3.6 |
| HHM | 9.4 | 6.3 | 1.8 | 1.2 |
| HHL | 12.2 | 8.1 | 11.2 | 7.5 |
| HLM/HLL | 1.5 | 1.5 | 0.3 | 0.3 |
| (HMM + HLM + HLL + HHM + HHL)/SOS | 2.6 | 1.7 | 1.1 | 0.7 |
| (HMM + HLM + HLL)/(HHM + HHL) | 1.1 | 1.1 | 0.6 | 0.6 |
| C24 to 30 | 2.3 | 1.6 | 0.1 | 0.0 |
| Fatty acids having 20 or more carbon atoms with respect to total amount of H | 1.2 | 1.2 | 1.3 | 1.3 |
| Evaluation results | | | | |
| Melting feeling in the mouth | ⊚ | ⊚ | ⊚ | ⊚ |
| Anti-bloom | | | | |
| 8° C. | ⊚ | ⊚ | X | X |
| 20° C. | ⊚ | ⊚ | Δ | Δ |

[Evaluation of Melting Feeling in the Mouth]
⊚: Very good
O: Good
Δ: Fair
x: Poor

[Evaluation of Anti-Bloom]
After the chocolate creams filled into the cup were stored at temperatures of 8° C. and 20° C., the number of days it took for bloom to occur was visually checked.
1 month or longer ⊚: good
2 weeks or longer and shorter than 1 month O: fair
1 week or longer and shorter than 2 weeks Δ: somewhat poor
Shorter than 1 week x: poor

What is claimed is:

1. An oily food containing fats/oils in a continuous phase, wherein the fats/oils contain SOS, HMM, HLM, HLL, HHM and HHL,
the mass ratio (HLM/HLL) of the content of HLM to the content of HLL is 1.0 or more,
the mass ratio (HMM+HLM+HLL+HHM+HHL)/SOS of the total content (HMM+HLM+HLL+HHM+HHL) of HMM, HLM, HLL, HHM and HHL to the content of SOS is 0.9 to 8,
the proportion of fatty acids having 20 or more carbon atoms with respect to the total amount of constituent fatty acids H in the above HMM, HLM, HLL, HHM and HHL is less than 3% by mass,
(wherein S, O, H, M, L, SOS, HMM, HLM, HLL, HHM and HHL have the following meanings,
S: saturated fatty acids having 16 to 24 carbon atoms,
O: oleic acid,
H: saturated fatty acids having 14 to 24 carbon atoms,
M: fatty acids having 6 to 10 carbon atoms,
L: lauric acid,
SOS: triacylglycerols in which S is ester-bonded at positions 1 and 3 and O is ester-bonded at position 2 of glycerol,
HMM: triacylglycerols in which 1 molecule of H and 2 molecules of M are ester-bonded to glycerol,
HLM: triacylglycerols in which 1 molecule of each of H, L and M is ester-bonded to glycerol,
HLL: triacylglycerols in which 1 molecule of H and 2 molecules of L are ester-bonded to glycerol,
HHM: triacylglycerols in which 2 molecules of H and 1 molecule of M are ester-bonded to glycerol,
HHL: triacylglycerols in which 2 molecules of H and 1 molecule of L are ester-bonded to glycerol.

2. The oily food according to claim 1, wherein the content of HLL is larger than the content of HMM (HLL>HMM).

3. The oily food according to claim 1, wherein the content of HHL is larger than the content of HHM (HHL>HHM).

4. The oily food according to claim 1, wherein a ratio (HMM+HLM+HLL)/(HHM+HHL) of the total content (HMM+HLM+HLL) of HMM, HLM and HLL to the total content (HHM+HHL) of HHM and HHL is 0.7 to 1.3.

5. The oily food according to claim 1, wherein the content of C24 to 30 of the fats/oils is 0.3 to 6% by mass, wherein C24 to C30 represents triacylglycerols in which a total number of carbon atoms of three fatty acids ester-bonded to glycerol is 24 to 30.

6. The oily food according to claim 1, wherein the fats/oils include cocoa butter.

7. The oily food according to claim 1, wherein the fats/oils include transesterified fats/oils containing 2 to 30% by mass of medium-chain fatty acid triacylglycerol, 30 to 95% by mass of lauric fats/oils and 0 to 60% by mass of non-lauric fats/oils as raw fats/oils.

8. A method of producing the oily food containing fats/oils in a continuous phase according to claim 1, the method comprising
adjusting a mass ratio (HMM+HLM+HLL+HHM+HHL)/SOS of the total content (HMM+HLM+HLL+HHM+HHL) of HMM, HLM, HLL, HHM and HHL to the content of SOS contained in the fats/oils to 0.9 to 8 using at least cocoa butter and transesterified fats/oils, wherein the transesterified fats/oils contain 2 to 30% by mass of medium-chain fatty acid triacylglycerol, 30 to 95% by mass of lauric fats/oils and 0 to 60% by mass of non-lauric fats/oils as raw fats/oils.

\* \* \* \* \*